(12) United States Patent
Takashiba

(10) Patent No.: US 6,553,978 B2
(45) Date of Patent: Apr. 29, 2003

(54) AIR POLLUTION PREVENTING DEVICE IN INTERNAL COMBUSTION ENGINE

(75) Inventor: Kazuhiro Takashiba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 71 days.

(21) Appl. No.: 09/820,171

(22) Filed: Mar. 29, 2001

(65) Prior Publication Data

US 2002/0000223 A1 Jan. 3, 2002

(30) Foreign Application Priority Data

Jun. 30, 2000 (JP) ........................................ 2000-198511

(51) Int. Cl.[7] ........................... F02M 25/07; F02B 25/06
(52) U.S. Cl. ................................... 123/568.15; 123/572
(58) Field of Search ..................... 123/568.15, 568.17, 123/568.18, 568.12, 572, 184.21, 184.22

(56) References Cited

U.S. PATENT DOCUMENTS

| 4,359,035 A | * | 11/1982 | Johnson ........................ 123/573 |
| 4,449,498 A | * | 5/1984 | Horiuchi .................. 123/339.13 |
| 4,558,681 A | * | 12/1985 | Mookerjee ............. 123/568.11 |
| 5,014,654 A | * | 5/1991 | Ishibashi ................ 123/184.38 |
| 5,205,265 A | * | 4/1993 | Kashiyama et al. ... 123/568.12 |
| 5,307,784 A | | 5/1994 | Choma et al. |
| 6,189,521 B1 | * | 2/2001 | Hancock ................ 123/184.47 |

FOREIGN PATENT DOCUMENTS

| EP | 58070015 | 4/1983 |
| EP | 0 369 482 | 11/1989 |
| JP | 5-99079 | 4/1993 |

* cited by examiner

Primary Examiner—Henry C. Yuen
Assistant Examiner—Mahmoud Gimie
(74) Attorney, Agent, or Firm—Arent Fox Kintner Plotkin & Kahn, PLLC

(57) ABSTRACT

An air pollution preventing device for preventing release of blow-gas within a crank chamber to the atmosphere and restraining discharge of polluting substance within burned gas by returning exhaust gas to a combustion chamber is provided. A blow-by gas treatment chamber unit and an exhaust gas return chamber unit are placed one upon another on a suction manifold. The blow-by gas treatment chamber unit has a blow-by gas chamber communicating with a crank chamber through a blow-by gas passage and a blow-by gas passage leading from the blow-by gas chamber to a suction passage. The exhaust gas return chamber unit has an exhaust gas return chamber communicating with an exhaust passage through an exhaust gas return passage and an exhaust gas return passage leading from the exhaust gas return chamber to a suction passage.

3 Claims, 4 Drawing Sheets

AIR POLLUTION PREVENTING DEVICE IN INTERNAL COMBUSTION ENGINE

BACKGROUND OF THE INVENTION

The present invention relates to an air pollution preventing device in an internal combustion engine in which discharge of blow-by gas in a crank chamber to the atmosphere is prevented, and exhaust gas is returned to a combustion chamber to restrain release of polluting substance contained in burned gas.

An air pollution preventing device in which blow-by gas and exhaust gas are led to a suction chamber provided on a top of an internal combustion engine to be mixed with suction air and supplied to a combustion chamber, has been known as shown in Japanese Laid-Open Patent Publication Hei 5-99079.

In this air pollution preventing device, a blow-gas passage and an exhaust gas return passage leading to the suction chamber are arranged on a straight line crossing a plurality of parallel manifold suction passages. Ends of the blow-by gas passage and the exhaust gas return passage are opened in the suction chamber facing each other, and a partition wall hanging from a top wall of the suction chamber is positioned between the openings of the blow-by gas passage and the exhaust gas return passage. Therefore, blow-by gas entering the suction chamber from the blow-by gas passage and return exhaust gas entering the suction chamber from the exhaust gas return passage are directed downward by the partition wall to be mixed with each other and supplied to a manifold suction passage opening to the suction chamber.

In the above-mentioned air pollution preventing device, since return exhaust gas having not been cooled enough comes into contact with blow-by gas not pre-cooled yet, oil mists and the like in the blow-by gas accumulate just beneath the partition wall as a sludge to lower flow rate of the return exhaust gas.

Since the confluence of the return exhaust gas and the blow-by gas is positioned near one manifold suction passage among a plurality of manifold suction passages, temperatures and flow rates of the return exhaust gases and the blow-by gases entering respective manifold suction passages are different from one another.

SUMMARY OF THE INVENTION

In order to cope with such problems and improve the customary air pollution preventing device, the present invention provides an air pollution preventing device in an internal combustion engine having a blow-by gas treatment chamber unit and an exhaust gas return chamber unit placed one upon another on a suction manifold. The blow-by gas treatment chamber unit has a blow-by gas chamber communicating with a crank chamber through a blow-by gas passage and a blow-by gas passage leading from the blow-by gas chamber to a suction passage, and the exhaust gas return chamber unit has an exhaust gas return chamber communicating with an exhaust passage through an exhaust gas return passage and an exhaust gas return passage leading from the exhaust gas return chamber to a suction passage.

According to this invention, return exhaust gas flowing in the exhaust gas return chamber and the exhaust return passage leading from the exhaust gas return chamber to the suction passage is cooled by atmospheric air coming into contact with an outer surface of the exhaust gas return chamber unit and also by the blow-by gas treatment chamber unit coming into contact with the exhaust gas return chamber unit, then mixed with the blow-by gas together with suction air flowing in the suction passage. As the result, sludge resulting from reaction of oil mist within the blow-by gas is reduced greatly.

Since the blow-by gas treatment chamber unit and the exhaust gas return chamber unit are placed one upon another on the suction manifold, the internal combustion engine can be miniaturized as a whole.

The exhaust gas return passage between the exhaust gas return chamber and the exhaust passage may have an exhaust gas return valve, at least a portion of the exhaust gas return passage on down stream side of the exhaust gas return valve may be formed by a corrugated pipe, and an outer wall of the exhaust gas return chamber may be provided with cooling fins. The return exhaust gas is cooled by the corrugated pipe and the cooling fins more efficiently.

Every suction passages of the suction manifold may communicate with the blow-by gas chamber and the exhaust gas return chamber through respective blow-by gas passages and exhaust gas return passages. Cooling of the return exhaust gas is promoted more, the return exhaust gas is uniformly supplied to combustion chambers of the internal combustion engine through the suction passages, combustions in the combustion chambers are equalized, and discharge of polluting substance is restrained more effectively.

DETAILED DESCRIPTION OF THE PREFERRED EMBODIMENT

Figure 1:
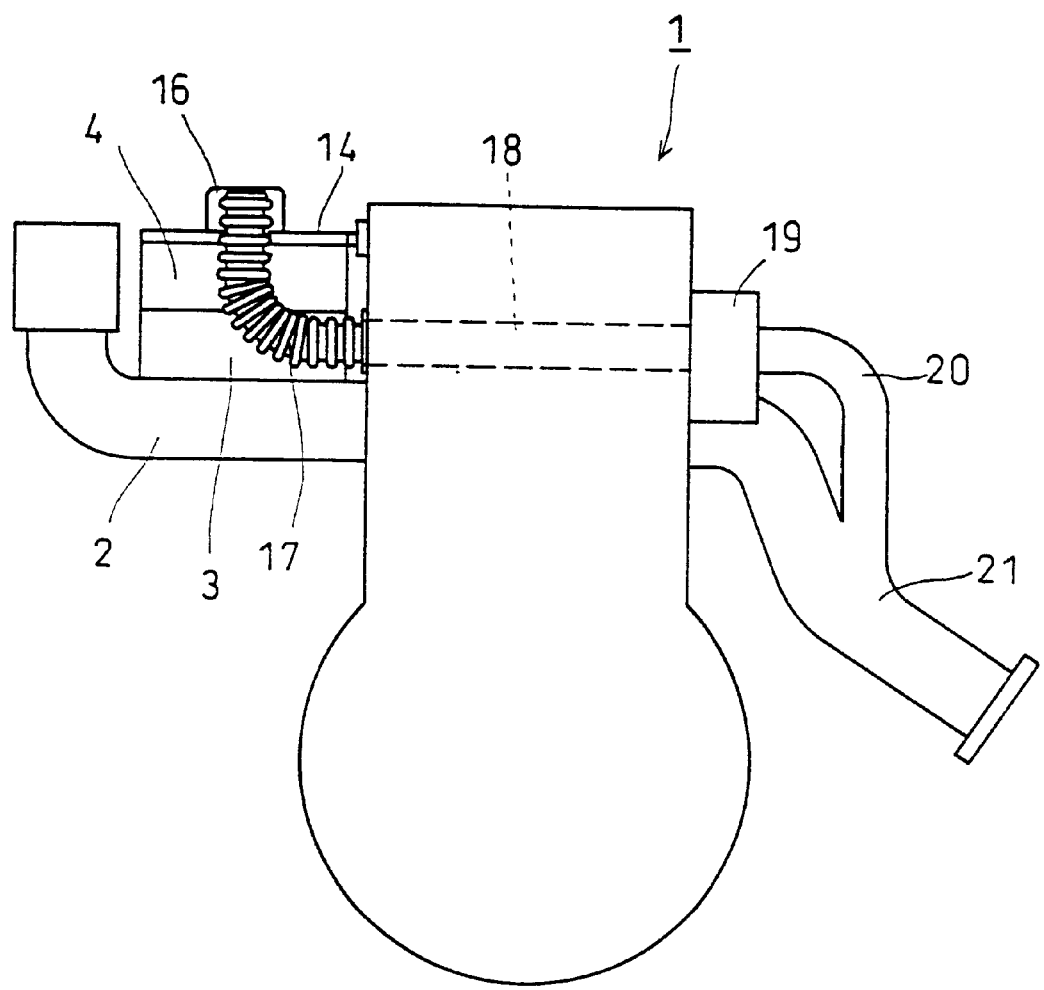
FIG. 1 is a side view of an internal combustion engine provided with an air pollution preventing device according to the present invention.
Figure 2:
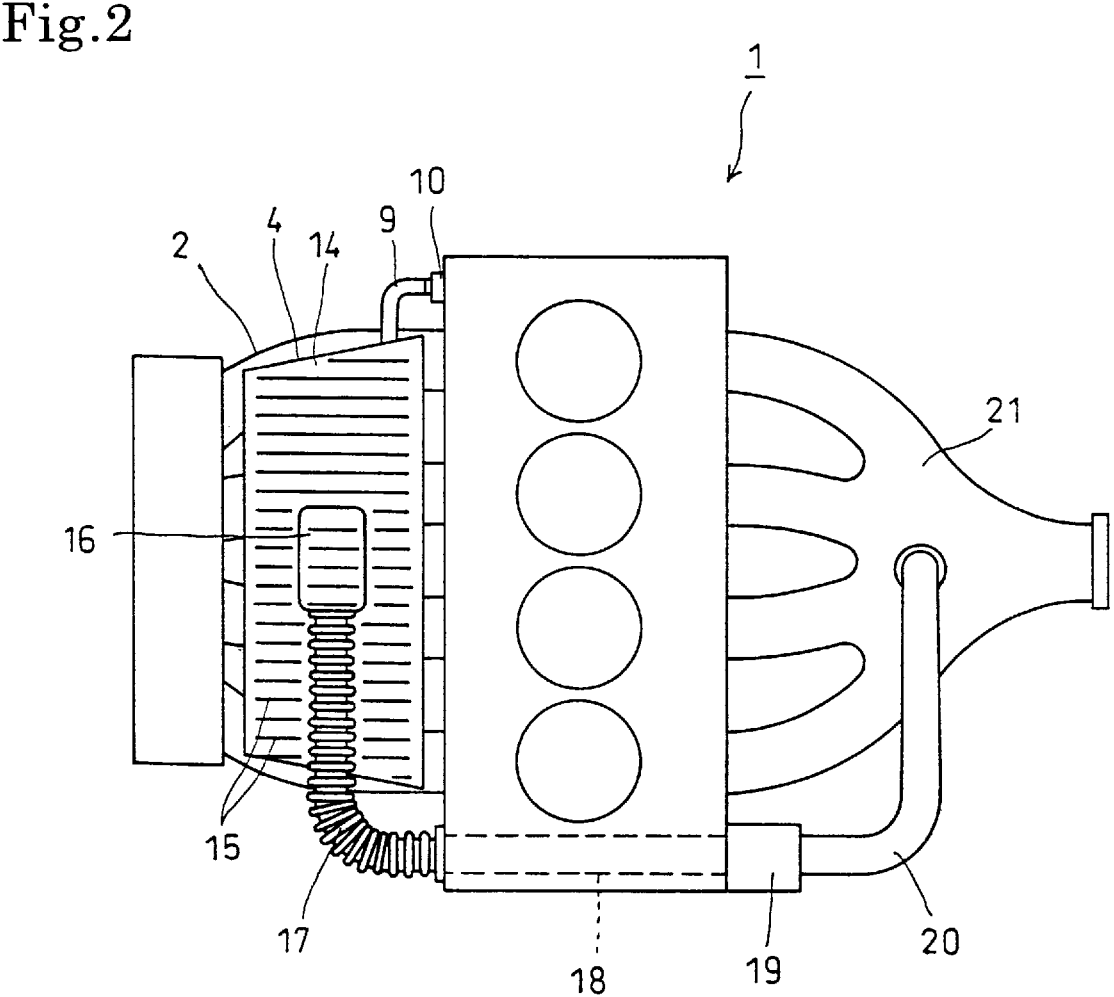
FIG. 2 is a plan view of FIG. 1.
Figure 3:
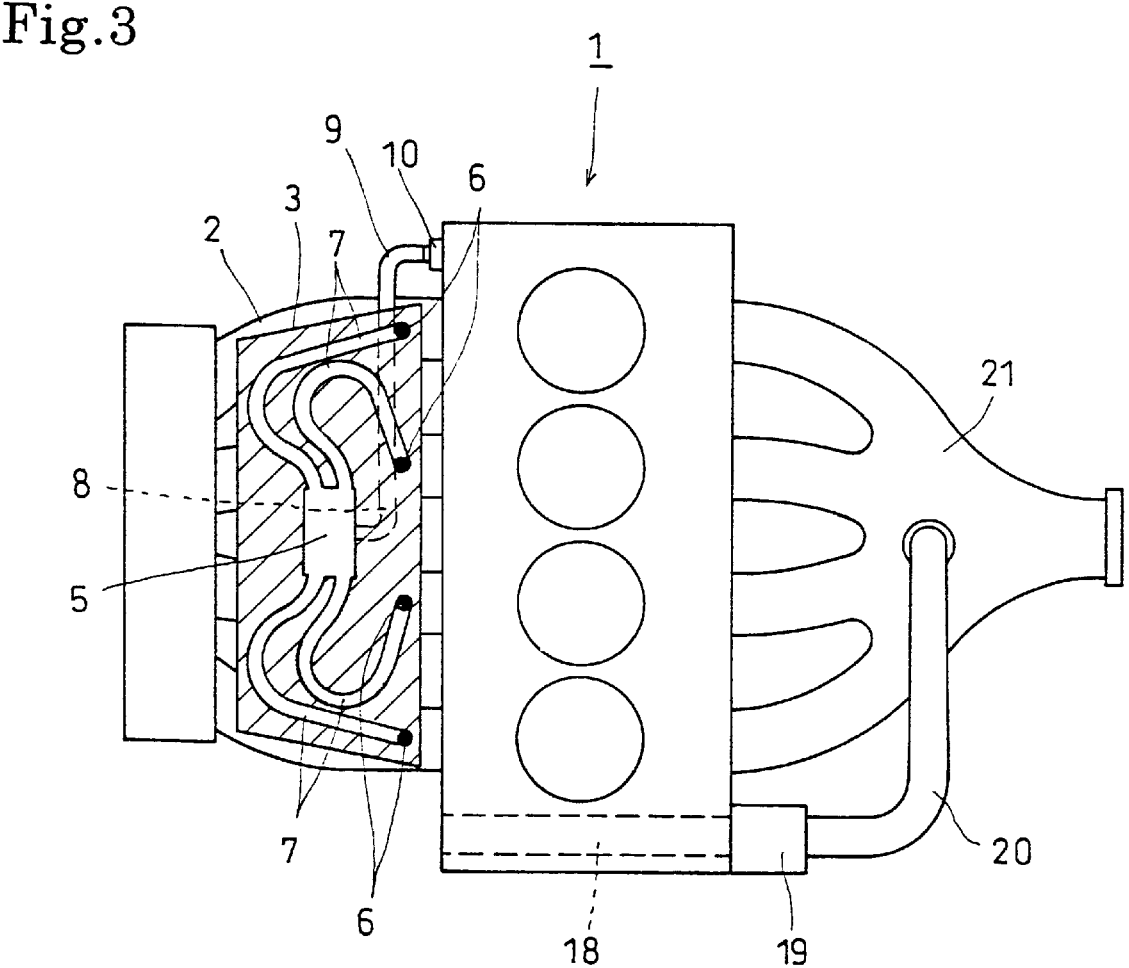
FIG. 3 is a plan view of the internal combustion engine of FIG. 1 from which the exhaust gas return chamber unit is removed for showing the blow-by gas treatment chamber unit.

Hereinafter, an embodiment of the present invention will be described with reference to FIGS. 1 to 4.

The shown vertical 4-cylinder internal combustion engine 1 is a spark-ignition type, 4-stroke-cycle, 4-cylinder internal combustion engine of cylinder injection type in which gasoline is directly injected into a combustion chamber. On a suction manifold 2 of the vertical 4-stroke internal combustion engine 1 are placed a blow-by gas treatment chamber unit 3 and an exhaust gas return chamber unit 4 one upon another.

The blow-by gas treatment chamber unit 3 is a solid body of light alloy having a blow-by gas receiving recess (blow-by gas chamber) 5 formed at a center of the upper surface. Each suction passage of the suction manifold 2 has a communication port 6 opening at a down stream portion. These communication ports 6 are connected with the blow-by gas receiving recess 5 through respective branch communication grooves 7 formed on the upper surface of the blow-by gas treatment chamber unit 3. Passage lengths of the branch communication grooves are about equal to each other. A blow-by gas communication passage 8 communicating with the blow-by gas receiving recess 5 of the blow-by gas treatment chamber unit 3 is connected to a blow-by gas discharge opening 10 through a connecting pipe 9. The blow-by gas discharge opening 10 communicates with a crank chamber (not shown) of the vertical internal combustion engine 1. On the upper surface of the blow-gas treatment chamber unit 3 is joined an exhaust gas return chamber unit 4 in air and water tight to tightly close the blow-by gas receiving recess 5 and the branch communication grooves 7. Blow-by gas in the crank chamber of the engine 1 is led into the blow-gas receiving recess 5 through the blow-by gas discharge opening 10, the connecting pipe 9 and the blow-by gas communication passage 8, then distributed to the four branch communication grooves 4, and discharged into downstream portions of the suction passages of the suction manifold 2 through the branch communication grooves 7 and the communication ports 6.

Figure 4:
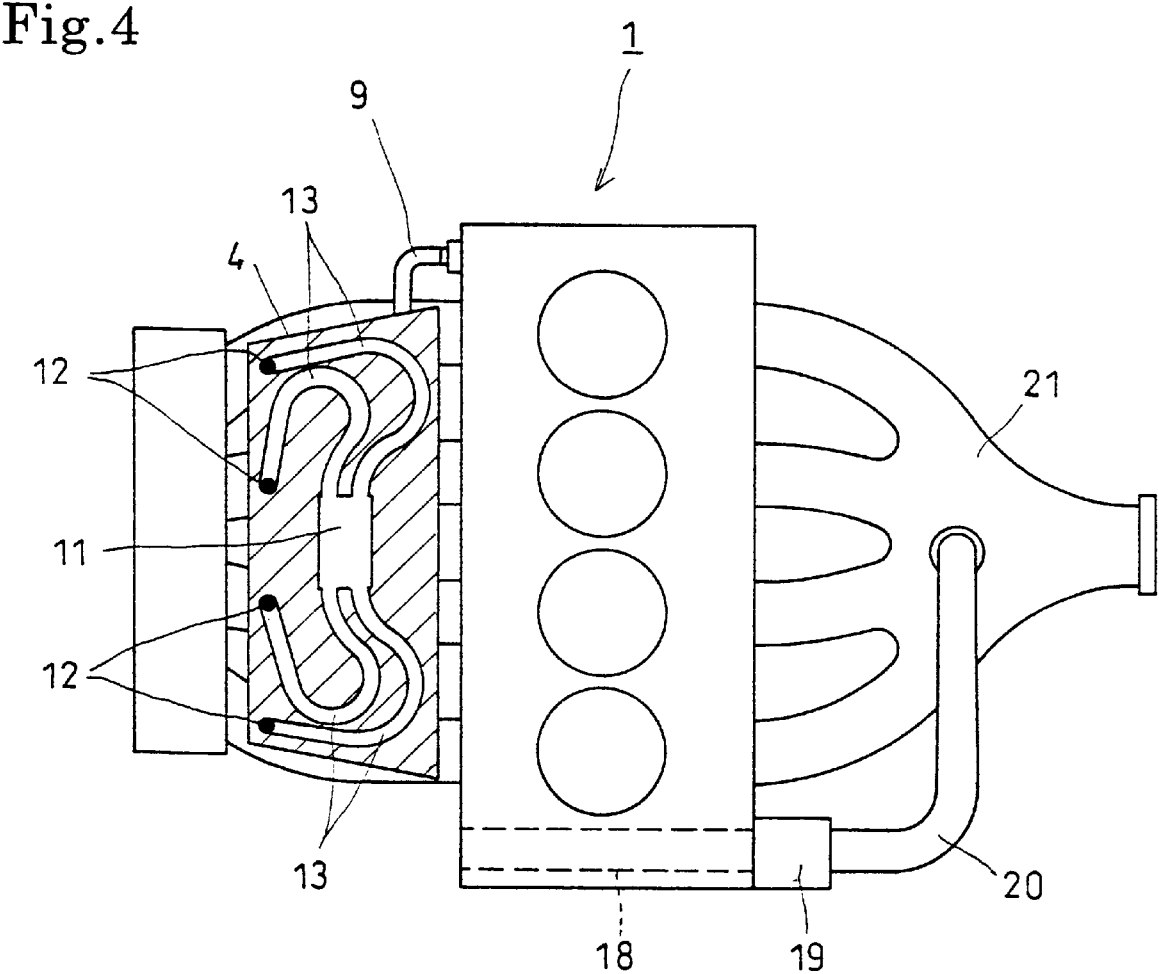
FIG. 4 is a plan view of the engine from which an exhaust gas return chamber unit cover is removed.

The exhaust gas return chamber unit 4 joined to the upper surface of the blow-by gas treatment chamber unit 3 is also a solid body of light alloy. As shown in FIG. 4, a return exhaust gas receiving recess (exhaust gas return chamber) 11 is formed at a center of the upper surface of the exhaust gas return chamber unit 4. Further, on the upper surface are formed branch communication grooves 13 winding above the branch communication grooves 7 of blow-by gas treatment chamber unit 3. The branch communication grooves 13 have equal passage lengths, and each passage 13 connects a communication port 12 opening to an upstream portion of a suction passage of the suction manifold 2 with the return exhaust gas receiving recess 11. On the upper surface of the exhaust gas return chamber unit 4 is joined an exhaust gas return chamber unit cover 14 in air-watertight, and on the upper surface of the cover 14 are projected a large number of parallel cooling fins 15.

The exhaust gas return chamber unit cover 14 is attached with a corrugated pipe attachment 16 positioned just above the return exhaust gas receiving recess 11. To the corrugated pipe attachment 16 is connected an end of a corrugated pipe 17, another end of which is connected to an end of an exhaust gas return passage 18 penetrating a cylinder block or a cylinder head of the vertical 4-cylinder internal combustion engine 1. At another end of the exhaust gas return passage 18 is provided an exhaust gas return control valve 19 which is connected with an exhaust manifold 21 through an exhaust gas return pipe 20. A part of exhaust gas discharged from the vertical 4-cylinder internal combustion engine 1 into the exhaust manifold 21 is led into the return exhaust gas receiving recess 11 through the exhaust gas return pipe 20, the exhaust return control valve 19, the exhaust gas return passage 18, the corrugated pipe 17 and the corrugated pipe attachment 16, then supplied to an upstream portions of suction passages of the suction manifold 2 through the branch communication grooves 13 and the communication ports 12.

In the embodiment shown in FIGS. 1 to 4, blow-by gas generated in the crank chamber of the engine 1 is discharged evenly to the downstream portions of the suction passages of the suction manifold 2 through the blow-by gas discharge opening 10, the connecting pipe 9, the blow-by gas receiving recess 5, the branch communication grooves 7 and the communication ports 6, and burned evenly in the combustion chambers of the engine 1. As the result, combustion states in every cylinders become equal and a good operation condition can be obtained.

A part of exhaust gas flowing in the exhaust manifold 21 is led to the return exhaust gas receiving recess 11 through the exhaust gas return pipe 20, the exhaust gas return control valve 19, the exhaust gas return passage 18, the corrugated pipe 17 and the corrugated pipe attachment 16. The exhaust gas in the return exhaust gas receiving recess 11 which has been controlled into a proper flow rate by the exhaust gas return control valve 19, is supplied evenly to the upstream portions of the suction passages of the suction manifold 2 through the branch communication grooves 13 of the same passage length and the communication ports 12. As the result, the return exhaust gases in the combustion chambers of the engine 1 are mixed with the suction air respectively substantially with the same mixing ratio, combustion states in every cylinders become equal, and a good operation condition can be obtained.

The return exhaust gas is cooled enough by the exhaust gas return passage 18 within the main body of the vertical 4-cylinder internal combustion engine 1, the corrugated pipe 17 and the exhaust gas return chamber unit cover 14 with the cooling fins 15, and further cooled by heat-exchange with the blow-by gas treatment chamber unit 3 contacted with the under side of the exhaust gas return chamber unit 4. Then the return exhaust gas is mixed with the suction air and comes into contact with the blow-by gas in a low temperature condition at the downstream portion of the suction passage. Therefore, generation of sludge owing to reaction of the return exhaust gas with oil mist in the blow-by gas is restrained greatly.

What is claimed is:

1. An air pollution preventing device in an internal combustion engine, comprising a blow-by gas treatment chamber unit having a first body, and an exhaust gas return chamber unit having a second body, said first and second bodies being placed in mutual contact one upon the other on a suction manifold, said blow-by gas treatment chamber unit having a blow-by gas chamber communicating with a crankcase chamber through a first blow-by gas passage and a second blow-by gas passage leading from said blow-by gas chamber to a suction passage, said exhaust gas return chamber unit having an exhaust gas return chamber with an exhaust passage through a first exhaust gas return passage and a second exhaust gas return passage leading from said exhaust gas return chamber to said suction passage.

2. An air pollution preventing device in an internal combustion engine as claimed in claim 1, wherein said exhaust gas return passage between said exhaust gas return chamber and said exhaust passage has an exhaust gas return valve, at least a portion of said exhaust gas return passage on downstream side of said exhaust return valve is formed by a corrugated pipe, and an outer wall of said exhaust gas return chamber is provided with cooling fins.

3. An air pollution preventing device in an internal combustion engine as claimed in claim 1 or 2, wherein every suction passages of said suction manifold communicate with said blow-by gas chamber and said exhaust gas return chamber through respective blow-by gas passages and exhaust gas return passages.

* * * * *